United States Patent
Goulon et al.

(10) Patent No.: US 12,032,504 B2
(45) Date of Patent: Jul. 9, 2024

(54) DEVICE FOR INTERCONNECTING TWO TERMINALS

(71) Applicant: Banks and Acquirers International Holding, Suresnes (FR)

(72) Inventors: Maxime Goulon, Chatuzange-le-Goubet (FR); Eric Philibert, Saint-Marcellin (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 200 days.

(21) Appl. No.: 17/786,926

(22) PCT Filed: Dec. 11, 2020

(86) PCT No.: PCT/EP2020/085839
§ 371 (c)(1),
(2) Date: Jun. 17, 2022

(87) PCT Pub. No.: WO2021/122396
PCT Pub. Date: Jun. 24, 2021

(65) Prior Publication Data
US 2023/0030306 A1 Feb. 2, 2023

(30) Foreign Application Priority Data

Dec. 20, 2019 (FR) .................................. 1915338

(51) Int. Cl.
*G06F 13/40* (2006.01)
*H04M 1/02* (2006.01)
*H04M 1/72409* (2021.01)

(52) U.S. Cl.
CPC ...... *G06F 13/4068* (2013.01); *H04M 1/0254* (2013.01); *H04M 1/72409* (2021.01); *H02J 2310/22* (2020.01)

(58) Field of Classification Search
CPC combination set(s) only.
See application file for complete search history.

(56) References Cited

U.S. PATENT DOCUMENTS

| 6,844,846 B1* | 1/2005 | Riday | G01S 19/35 |
| | | | 342/357.74 |
| 9,665,525 B2* | 5/2017 | Soffer | G06F 13/4068 |
| (Continued) | | | |

FOREIGN PATENT DOCUMENTS

| CN | 106655346 A | 5/2017 |
| EP | 2649699 A1 | 10/2013 |
| (Continued) | | |

OTHER PUBLICATIONS

International Search Report dated Dec. 18, 2020 for corresponding International Application No. PCT/EP2020/085839, Dec. 11, 2020.
(Continued)

*Primary Examiner* — Lisa Lea-Edmonds
(74) *Attorney, Agent, or Firm* — David D. Brush; Westman, Champlin and Koehler, P.A.

(57) ABSTRACT

A device for interconnecting two communication terminals. More particularly, the device interconnects a first terminal with a second terminal. The device includes a first male connector, intended to be inserted into a corresponding female connector of the first terminal and a second male connector intended to be inserted into a corresponding female connector of the second terminal. The first male connector is a reversible connector including at least two sets of functionally identical pins. The device also includes a female connector, at least partially connected to a first set of pins of the first male connector by a transfer circuit and the second male connector is at least partially connected to a second set of pins of the first male connector by an interconnection circuit.

6 Claims, 3 Drawing Sheets

(56) References Cited

U.S. PATENT DOCUMENTS

| | | | |
|---|---|---|---|
| 9,690,743 B2* | 6/2017 | Eliyahu | G06F 13/4068 |
| 9,941,711 B2 | 4/2018 | Lacroix | |
| 9,952,997 B2* | 4/2018 | Lee | G06F 13/4022 |
| 10,033,207 B2* | 7/2018 | Mecca | H02J 7/0044 |
| 11,386,242 B2* | 7/2022 | Hernandez | G06F 21/88 |
| 11,614,776 B2* | 3/2023 | DeCamp | F16M 11/041 |
| | | | 361/679.41 |
| 2003/0050102 A1* | 3/2003 | Roh | H04B 1/3883 |
| | | | 455/571 |
| 2010/0121991 A1* | 5/2010 | Kim | H04M 1/72409 |
| | | | 710/16 |
| 2012/0229967 A1* | 9/2012 | Zhou | H01R 13/72 |
| | | | 361/679.01 |
| 2013/0060971 A1* | 3/2013 | Kim | H04M 1/72409 |
| | | | 710/16 |
| 2013/0320761 A1 | 12/2013 | Lacroix | |
| 2014/0129740 A1* | 5/2014 | Wang | G06F 3/00 |
| | | | 710/15 |
| 2015/0032559 A1* | 1/2015 | Sonnendorfer | H04M 1/72412 |
| | | | 705/21 |
| 2015/0356045 A1* | 12/2015 | Soffer | G06F 3/023 |
| | | | 710/303 |
| 2016/0091925 A1* | 3/2016 | Ardisana, II | G06F 1/1632 |
| | | | 361/679.43 |
| 2016/0275031 A1* | 9/2016 | Lee | G06F 13/4068 |
| 2018/0121373 A1* | 5/2018 | Qiu | G06F 13/20 |
| 2021/0249826 A1* | 8/2021 | Sun | H01R 13/7039 |

FOREIGN PATENT DOCUMENTS

| | | |
|---|---|---|
| EP | 3486792 A1 | 5/2019 |
| WO | 2012076570 A1 | 6/2012 |

OTHER PUBLICATIONS

Written Opinion of the International Searching Authority dated Dec. 18, 2020 for corresponding International Application No. PCT/EP2020/085839, filed Dec. 11, 2020.

French Search Report and Written Opinion with English machine translation dated Oct. 30, 2020 for corresponding French Application No. 1915338, filed Dec. 20, 2019.

English translation of the Written Opinion of the International Searching Authority dated Jan. 15, 2021 for corresponding International Application No. PCT/EP2020/085839, filed Dec. 11, 2020.

* cited by examiner

DEVICE FOR INTERCONNECTING TWO TERMINALS

CROSS-REFERENCE TO RELATED APPLICATIONS

This Application is a Section 371 National Stage Application of International Application No. PCT/EP2020/085839, filed Dec. 11, 2020, which is incorporated by reference in its entirety and published as WO 2021/122396 A1 on Jun. 24, 2021, not in English.

1. TECHNICAL FIELD

The invention relates to the field of interconnection between two electronic devices. More particularly, the invention relates to the interconnection between two terminals, at least one of which has a standardised interface (of the USB type). More specifically, the invention relates to a device for interconnecting terminals allowing simultaneous charging of the two connected terminals while leaving the standardised interface free.

2. PRIOR ART

Due to the rise of user communication terminals (of tablet or smartphone type), it is common for professionals to use terminals initially intended for the general public, to perform certain tasks of their professional activity. This is particularly the case of doctors, who carry out home visits, or else taxi drivers, security officers, merchants on the move, etc. These professionals often have a terminal dedicated to their activity, called a professional terminal. For the doctor, such a professional terminal can be in the form of a social security card reader (that is to say Carte Vitale' in France). For the taxi driver or merchant on the move, such a professional terminal can be in the form of a payment terminal. For the security officer, such a terminal can be in the form of a detection and/or monitoring console. These professional terminals have certain features that are adapted to the services they provide, such as increased security, dedicated processing processors and secure applications. These professional terminals, however, do not necessarily have extensive processing capabilities and are often confined to the functions for which they were programmed. It is for this reason that professionals are equipped with general-purpose communication terminals that embed dedicated business applications. For the doctor, it is for example a tablet comprising one or more applications for editing treatment sheets. For the taxi driver or merchant on the move, these are applications for taking orders and/or appointments or else geolocation applications, installed on a smartphone. This situation can also be present when no mobility situation is present: more and more physical stores are equipped with a payment terminal and a tablet, the latter comprising one or more point-of-sale (POS) applications.

However, the growing digitisation of the activity of professionals increasingly leads to the need to connect, at least temporarily, the professional terminal and the user terminal so that both can carry out information exchanges to implement common digital services. For example, for the doctor, the social security card reader provided to the application for editing the care sheet (of the user terminal), the data necessary for establishing an electronic care sheet which can for example be transmitted directly to the organisation in charge of the management of the insured, or the application for editing the care sheet provided to the reader of the social security card with data which is entered on the card of the insured. In the case of the salesperson on the move, the mobile point-of-sale application provides the payment terminal with the amount of purchases made by the customer before payment; and the payment terminal provides the mobile point-of-sale application with validation or invalidation data for the transaction carried out using the customer's payment card. Regardless of the situation, it is often necessary to physically connect the two terminals together so that they can have a data exchange interface. In particular, professional terminals may require more or less constant connections to user terminals in order to take advantage of the latter's ability to provide more or less complex services, which professional terminals are not able to provide.

For this purpose, on the user terminal side, the use of the USB port (USB-C or micro USB type) or a Lightning™ port (specific to Apple™ brand devices) is the solution obviously implemented. On the professional terminal side, on the other hand, no specific solution is mainly adopted, even if the use of a USB port is also increasingly widespread. In any case, depending on the use made, integration difficulties or even impossibilities of integration arise. It is indeed difficult, and sometimes impossible, to physically connect the two devices. For example, for the Lightning™ port, it is necessary to develop specific application bricks, only to be able to carry out two-way communication, via this port, with a professional terminal.

Despite integration difficulties, or even integration impossibilities in some cases, the need to (re)connect both a user device (of a smartphone, tablet type) with another device (for example a professional terminal, which can be a payment terminal, an access terminal, a control terminal, etc.) is constant. This problem is often subdivided into several individual problems: communication as such is regulated by the implementation of software libraries; the problem of the physical connection is solved by manufacturing a special connection device such as a USB-c/USB cable or else Lightning™/micro-USB or else USB/proprietary when the connector of the professional terminal is proprietary. These physical connection solutions, however, have at least one problem: it lies in the monopolisation of the ports in question, starting with the port of the user device (but also that of the professional terminal), which consequently, is not available to support other apps, in particular charging its battery.

There are devices which are able to connect two terminals together, in particular for battery charge management needs. Such a device is presented in particular in the document EP2649699. More particularly, provision is made of a device which allows to carry out the physical pairing of two terminals, for example a payment terminal and a communication terminal, this device being able to carry out a management of the load of these two terminals (that is to say to carry out a balance for charging and discharging the battery of each terminal), in order to ensure that one of the terminals is able to recharge the other as much as necessary. On the other hand, the solution described in EP2649699 does not allow to recharge the terminals simultaneously while allowing to ensure communication between the communication terminal and the external environment (other than the professional terminal) via the same port. In other words, the existing solutions do not allow to maintain port availability (for example of the Lightning™ port or the USB-c port of the communication terminal, while ensuring that both terminals are charged. Existing solutions monopolise both the port of the communication terminal and the port of the professional terminal without allowing the simultaneous charging of these two devices.

3. SUMMARY OF THE INVENTION

The invention allows to overcome these problems of port monopolisation and battery charging not resolved by the techniques of the prior art.

More particularly, the invention relates to a device for interconnecting a first terminal with a second terminal, device comprising a first male connector, intended to be inserted into a corresponding female connector of the first terminal and a second male connector intended to be inserted into a corresponding female connector of the second terminal. The first male connector is a reversible connector comprising at least two sets of functionally identical pins [A] and [B]; The device comprises a female connector, at least partially connected to the first series of pins [A] of the first male connector by a transfer circuit and the second male connector is at least partially connected to the second series of pins [B] of the first male connector by an interconnection circuit.

Thus, the invention allows both to connect two terminals together while leaving an additional connection port free.

According to a particular embodiment, the female connector is a reversible connector.

Thus, the device offers the possibility of continuing to take advantage of the reversibility of the first communication terminal by transferring this reversibility to the female connector of the device.

According to a particular feature, the interconnection device further comprises an additional power supply connector.

Thus, the invention offers the possibility of recharging both the first terminal and the second terminal without obstructing the female port.

According to a particular embodiment, the transfer circuit and the interconnection circuit are at least partially under the control of an electronic interconnection subsystem which comprises a data transfer switch and a power supply diverter.

Thus, the invention allows to automatically manage the switching between the modes of use.

According to a particular feature, the power supply diverter comprises a pull-up resistor [#1] connected to a specific pin of the first male connector.

Thus, the invention cleverly simulates the passage to "master" mode of the first terminal so that it can provide an electrical power supply to the second terminal.

According to a particular embodiment, the electronic interconnection subsystem further comprises a timer.

Thus, the invention allows to make transitions between the different uses of the interconnection device in a way which is smoother and respectful of the electronic components of the terminals.

In another configuration, the invention relates to a payment system comprising:
  a communication terminal having a reversible female port;
  a payment terminal having a female USB type port;
  This system also comprises an interconnection device as described above.

4. BRIEF DESCRIPTION OF FIGURES

Other features and advantages will appear more clearly upon reading the following description of a preferred embodiment, given by way of a simple illustrative and non-limiting example, and the appended drawings, among which:

5. DETAILED DESCRIPTION

5.1 Reminder of the General Principle

Figure 1:
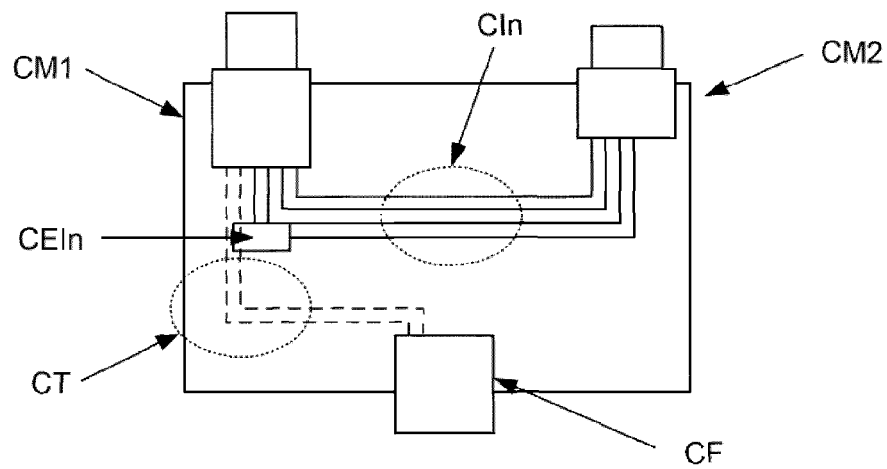
FIG. 1 shows the general principle of the interconnection device that is the subject of this document.

As previously mentioned, an object of the invention is to propose a device for interconnecting two terminals which on the one hand allows to manage the load of at least one of the two terminals and on the other hand allows the two terminals to exchange data, while leaving free at least one reversible standardised port (for example the USB_c or lightning port) of one of these terminals. Such an interconnection device, described in relation to FIG. 1, comprises a first reversible male connector (CM1) intended to be inserted into a reversible female connector of a first terminal and a second male connector (CM2) intended to be inserted into a female connector of a second terminal.

Figure 2:
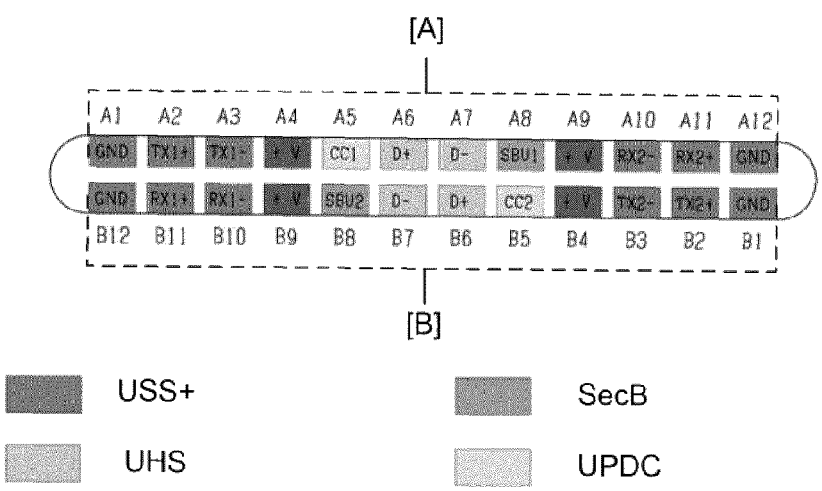
FIG. 2 shows an example of a reversible connector with which an interconnection device of the invention can be constructed.

As explained below, the two male connectors of the interconnection device are interconnected by an interconnection circuit (CIn) comprising several tracks (only a few tracks are shown), at least one of these tracks being managed by an electronic interconnection subsystem (CEIn). The interconnection device also comprises a reversible female connector (CF), connected at least to the first reversible male connector (CM1) by a circuit, called a transfer circuit (CT). For the purposes of the diagram, only a few tracks are shown. This transfer circuit (CT) also comprises several tracks connecting the reversible female connector to the reversible male connector and at least one of these tracks is managed by the electronic interconnection subsystem (CEIn). According to the invention, such a device is able to manage both the exchange of data between the two terminals connected to the first reversible male connector (CM1) and to the second male connector (CM2) and both other functions which can be provided by the female reversible connector (CF). For this purpose, advantage is taken of the first reversible male connector (CM1) which is divided into two distinct parts, as shown in FIG. 2. Indeed, the principle of reversible connectors is to duplicate the pins for the transmission of signals at the connectors, in particular female connectors.

According to the invention, part [A] of the first reversible male connector (CM1) is intended to be connected with the second male connector (CM2) in order to be able to exchange data, via the interconnection circuit. According to the invention, part [B] of the first male reversible connector is intended to be connected with the female reversible connector (CF) via the transfer circuit (CT). A reversible USB-C connector is shown in FIG. 2. The data transmission, power supply and ground pins are shown. The connector being reversible, each pin of part [A] comprises an equivalent pin in part [B]. For example, the pin A1 corresponds to pin B1, A2 to B2, etc. This, in the end, according to the invention, allows to wire the pins of part [A] and the pins of part [B] differently, at the cost of a modification of the reversibility feature of the male reversible connector CM1. In FIG. 2, the shades of grey represent different types of pin, each having a particular function, of which USS+ represents the communication pins "USB 3.1 Super Speed" (A2, A3, A10, A11, B2, B3, B10, B11) at 10 Gbs, UHS represents the communication pins "USB 2.0 High Speed" (A6, A7, B6, B7) at 480 Mbps, SECB represents the secondary bus (A8, B8) and UPDC represents the communication pins for the USB power supply (A5, B5).

Thus, from a particular feature, specific to reversible connectors (that is to say the fact that a device can be inserted therein in any direction), the inventors have diverted this feature to attribute two distinct functions to this connector, without altering the operation of the terminals connected thereto. The interconnection device can therefore indiscriminately manage both a connection between a first terminal (for example a communication terminal), connected to the first reversible male connector and a second terminal connected to the second male connector (which is not necessarily reversible) while another device (a USB key, a charger) can be connected to the reversible female connector CF. As described later, in connection with one embodiment, a particular electronic circuit can be implemented to allow automatic interconnection of the terminals and the devices which are plugged to the various connectors.

In the example shown in FIG. 2, in order to maintain the principle of reversibility of the female connector, the two parts [A] and [B] of the female connector are connected together, that is to say: A1, B12, A12 and B1. A2 and B2. A3 and B3. A4, B9, A9 and B4. A5 and B5. A6 and B6. A7 and B7. A8 and B8. A10 and B10. and finally A11 and B11. Then, so that the connections necessary for the data transfers between the first terminal and the female connector CF are made transparently, the unused signals are connected directly to one of the parts of the first male connector CM (part [B] for example). Namely: RX+, RX−, GND, V+, SBV, CC2, TX+ and TX−. The connections made between the different pins of the connectors can be made either in the female connector (CF), or at the wiring itself, or at an interconnection node of the interconnection device.

In general, the interconnection device of the invention can be in the form of a Y-cable comprising the two male connectors and the female connector. In this configuration, the tracks (in particular power supply, but not only) of parts [A] and [B] of the reversible female connector are for example connected to the corresponding tracks of part [B] of the first reversible male connector. In this way, the reversibility feature of the female connector is preserved: the charger, which supplies current to the power supply tracks of parts [A] and [B] of the female connector, can always be inserted in any direction. The tracks of part [A] of the first reversible male connector are in turn connected to corresponding tracks of the second male connector, depending on the configuration and type of this second male connector. In this way, when a charger is plugged to the female connector and a first terminal plugged to the first male connector, the first terminal is able to receive power from the charger. Similarly, when other devices with other functions are plugged to the female reversible connector (USB key, security dongle, camera, etc.) they work correctly with the first terminal. In addition, when a second terminal is plugged to the second connector, the second terminal and the first terminal can exchange the data necessary for the implementation of their common functions. In addition, the first terminal is, if necessary, able to recharge the second terminal by supplying the latter with the necessary current via the power supply tracks: the first terminal is therefore alternately a receiver of current coming from the charger plugged to the female connector and supplying power, if necessary, to the second terminal.

The interconnection device of the invention can also be implemented in a box which can accept both a first terminal, able to be connected to the first reversible male connector and a second terminal able to be connected to the second male connector. The shapes and dimensions of this box are then adapted to the functions to be rendered both by the first terminal and by the second terminal and the box can for example place these two terminals back to back or align them side by side. The interconnection device of the invention is then located at the base of these two terminals and allows to connect them.

5.2. Description of an Embodiment

In this embodiment, a particular construction of the interconnection device according to the invention is described. More particularly, in this embodiment, the first reversible male connector is a USB-C type male connector, intended to be connected to a communication terminal of the smartphone or tablet type; the second male connector is a (micro or mini) USB connector, intended to be connected to a payment terminal. The female connector is also a USB-C connector, intended to receive a USB-C charger or else a USB-C key or dongle (for example a transaction security dongle) or a dock, that is to say a base to which the interconnection device is plugged. Thanks to the implementation of the principle and of a specific electronic system, the interconnection device of this previously described embodiment allows to automatically switch (without manual operation by the user) the signals between the terminals during the connection of the communication terminal with the interconnection device to automatically manage the load of the two parts of the system when the current arrives at the interconnection device, while maintaining the dialogue between the two terminals. The interconnection device manages the automatic switching of USB signals when the terminal is inserted therein, without new hardware developments on the payment terminal and without specific software, either on the communication terminal or on the payment terminal. The interconnection device thus allows to connect terminals already in the field.

In this embodiment, as in the general principle, the inventors had the idea of using the existing signals of the terminal (for example the payment terminal) in order to be able to switch the USB data bus of the USB-C connector of the interconnection device to the interface connector (also USB) of the payment terminal. The electronic interconnection subsystem (CEIn) is presented below in relation to FIGS. 3 and 4 and comprises both data transfer management and power supply management.

When the payment terminal is connected to the interconnection device: the USB-C (or Lightning) of the communication terminal is connected to the payment terminal.

When the payment terminal is absent from the interconnection device: the USB-C of the communication terminal is connected to the USB-C (female port) of the interconnection device.

Thus, thanks to the invention, it is possible to switch the USB-C or Lightning signals from the communication terminal to the payment terminal when the latter is inserted into the interconnection device (called SLED). All the signals of the USB-C of the interconnection device (except USB_DP and USB_DN) are deported to the communication terminal connector in order to retain the charging options based on the state of the pins CC1 and CC2 in the framework of the USB-C standard. To keep the charging options provided by new generation chargers.

Figure 3:
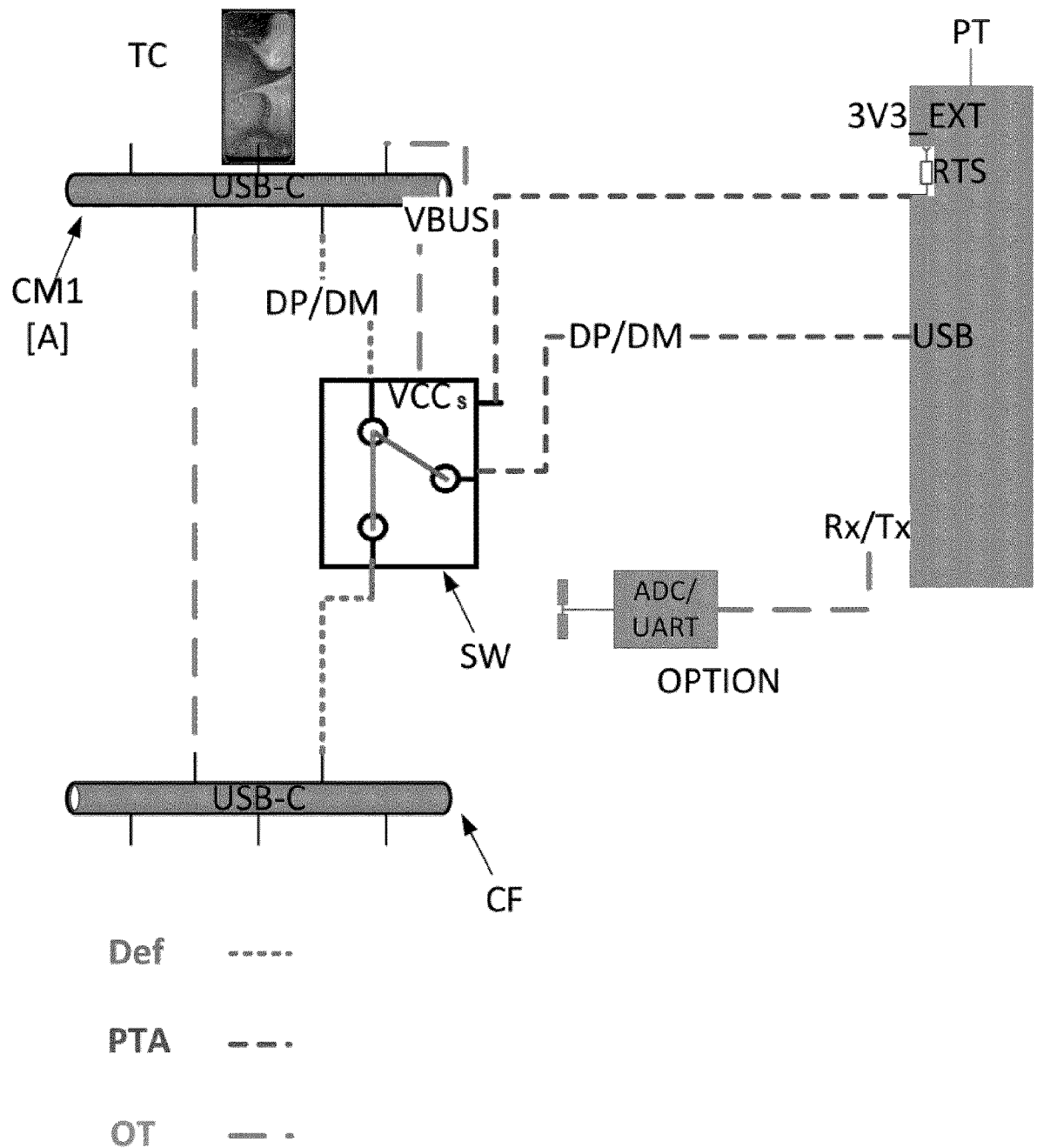
FIG. 3 illustrates a block diagram of the data interconnection wiring between the connectors of the interconnection device according to a particular embodiment.
Figure 4:
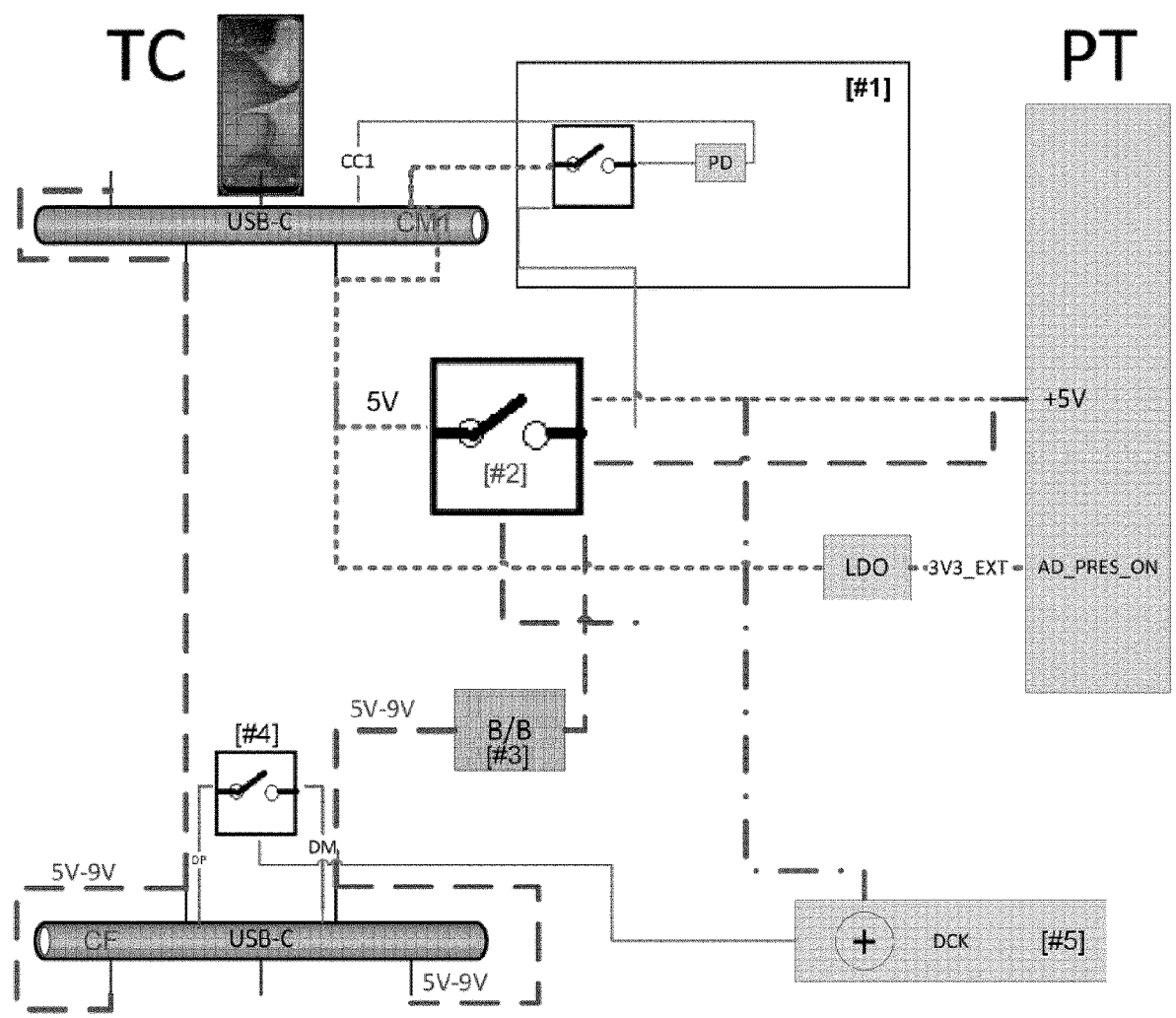
FIG. 4 illustrates a block diagram of the power supply wiring between the connectors of the interconnection device according to a particular embodiment.

FIGS. 3 and 4 show two views of the circuitry implemented to allow both terminal charging management and data exchange, in the form of an electronic interconnection subsystem (CEIn). FIG. 3 describes a block diagram of the signal commutation (that is to say of signal relating to data to be transferred) implemented in this subsystem, to automatically commutate the USB signals from the communication terminal to the payment terminal when inserting it into the interconnection device (SLED). By default USB signals are commutated to the female USB-C of the interconnection device. This kinematics allows to manage the different charging modes of the smartphone because they are controlled by the dialogue between the interconnection device and the communication terminal. In other words, as discussed here, the transfer circuit and the interconnection circuit are at least partially under the control of an electronic interconnection subsystem (CEIn) which comprises a data transfer switch (SW) and a power supply diverter (MAI). It is thus possible to automatically manage the switching between the modes of use of the interconnection system, and in particular of the first male connector (master mode, slave mode, mode where it charges the other terminals/devices, mode where it charges its own battery, mode where it transmits data). Thus, provision is made of a system for interconnecting two terminals comprising a free port, which is capable of simultaneously recharging these two terminals, while allowing to automatically manage the switching between the different modes of use of this system.

More particularly, for this implementation, a flow control UART signal (not used in most cases) is used in order to commutate a switch (SW). This signal is only available when the communication terminal is present: VBUS supplied and converted to 3V3 on A_D_PRESENT ON. The presence of the communication terminal polarises the UART connection on the payment terminal side and generates a 3V3 signal on the RTS pin. When this RTS pin is polarised, the USB signals automatically commutate to the payment terminal. Removing the payment terminal causes the RTS signal to switch to the low state and the switch USB then switches back to the female USB-C of the interconnection device—which receives the load or data.

FIG. 3 describes more particularly the management of the data exchange between the communication terminal (TC) and the payment terminal (PT). In default use (Def), the switch (SW) directly connects the female USB-C connector (CF) to part [A] of the male USB-C connector (CM1). The signals not impacted by data transmission (OT) do not pass through the switch and are transmitted directly between the female (CF) and male (CM1) connectors. These connections made, when the user wishes to connect a data cable (or other USB key device, security dongle) to the female connector CF to communicate with the communication terminal TC, the latter automatically recognises it (as if the interconnection device did not exist). The "transparent" mode is effective via part [A] of the first male connector CM1.

When the payment terminal is connected, as explained above, the UART is polarised and the USB signals commutate to the payment terminal. Part [B] of the male USB-C connector is then used to exchange data between the communication terminal and the payment terminal. More particularly, when the payment terminal (PT) is connected to the interconnection device, the switch (SW) is automatically activated via the use of one of the legs of the PT (RTS). The communication then takes place between the communication terminal (TC) and the payment terminal (PT) via pins D+ and D− of the two male connectors (CM1 and CM2).

In one embodiment, when the user wishes to establish communication via a data cable on the female connector (CF) (in short dotted line in FIG. 3), he performs a withdrawal from the payment terminal (PT) so that SW is deactivated. In another embodiment, rather than performing a physical withdrawal of the payment terminal, the use of a button provided for this purpose on the interconnection device can generate, via an electronic circuit, a withdrawal simulation (for example during a determined time). Alternatively, rather than having to press a button or perform the withdrawal from the payment terminal, one technique consists in assigning a software withdrawal function to the communication terminal, for example by installing a software component and/or an application provided for this purpose. In this way, a signal is transmitted from the communication terminal (TC) to the switch (SW) so that the latter resumes its initial data transmission configuration.

FIG. 4 describes more particularly the energy management at the interconnection device, implemented in this subsystem. Several scenarios are considered and are described here. They are managed by the power supply diverter (MAI), which comprises one or more of the power management mechanisms and system presented below ([#1], [#3], [#4], FIG. 4) depending on the operational implementation conditions.

Case 1: No External Power Supply Source:

Since the interconnection device does not have, as such, any power supply source, it is advantageous for the communication terminal (TC) to be able to supply sufficient current to operate the interconnection device on the one hand and the terminal on the other hand (if necessary, for example depending on the charge level of the battery of the payment terminal). By cleverly using the functionalities of the USB-C format, the communication terminal (TC) is switched to master mode. In this mode, the communication terminal supplies current to the device which is attached to its port (including the interconnection device, but also to a USB key or to the payment terminal attached to the interconnection device). For this purpose, the presence of an accessory is simulated via the system [#1], FIG. 4, on the pin CC1 (A, FIG. 2), by introducing a resistor. The communication terminal (TC) then provides the necessary 5V (short dotted lines) to the power supply of the interconnection device on the one hand and to that of the payment terminal on the other hand. When the system [#1] is activated (that is to say it switches into "Pull Down" (PD)), the current is delivered from the communication terminal (TC). In this embodiment, the system [#1] is a pull-down resistor. Other systems with the same function could be used.

In this embodiment, the pin CC2 (B5, FIG. 2) can be connected directly to the legs CC1/CC2 of the female connector (CF) then transposing this functionality (that is to say power supply) for an external accessory (dongle or USB key type), plugged to the female connector (CF).

Case 2: Presence of an External Power Supply Source on the Female Connector (CF) of the Interconnection Device.

Regardless of the power supply source applied to the female connector (CF), it is preferable, in particular to take advantage of this power supply source, that the communication terminal (TC) detects it and stops supplying current.

For this purpose, the application of this power supply source (5V-9V in wide dotted lines) automatically deactivates the system [#1] so that the communication terminal (CT) sees (perceives) an external source and switches to "Slave" mode, thus allowing to charge its own battery. The interconnection device also commutates [CIn] so that the power supply only comes from outside (wide dotted tracks) via the converter [#3] (B/B for BUCK/BOOST) lowering the voltage to 5V if necessary for the payment terminal (PT). Of course, this converter [#3] is only present in the case where voltages greater than 5V are considered).

There are multiple sources to power supply and charge the communication terminal (TC). For it to recognise and distinguish the sources which are connected to the female connector (CF), it is sufficient, according to the invention, to connect the tracks necessary for this detection between the female connector (CF) and the first connector itself (CM1), using, as explained previously, only one part of the connector (CM1). Thus, the payment terminal is able to adapt its charging behaviour to the power supply source connected to the first male connector (CM1): for example, the communication terminal can interchangeably continue to manage a new generation charger (9V) and/or a conventional charger (5V).

Case 3: Presence of an External Power Supply Source an Additional Connector (DCK)[#5]

In a complementary embodiment, an additional power supply connector (dedicated to this function) can be provided on the interconnection device. The purpose is to use this additional connector to simultaneously supply the system made up of the interconnection device, the communication terminal and the payment terminal. When a power supply is present on the connector (DCK), the principle implemented is the same as on the female connector (CF).

A direct power supply (5V) is provided to the payment terminal (long-dot dashed line). A power supply (5V) is also provided to the female connector (CF) (not shown for greater clarity), by dedicated wiring from the additional connector (DCK) to the corresponding tracks of the female connector (CF).

In addition, two mechanisms are implemented for the female connector (CF): on the one hand a mechanical keying is used to prevent the use of the female connector (CF) when the system is placed on a charging base (not shown). On the other hand, for the communication terminal (TC) to recognise a standard charger, the DP (D+, A6, B6, FIG. 2) and DM (D−, A7, B7, FIG. 2) pins of the female connector (CF) are interconnected. A short-circuit simulation on these pins is performed using the mechanism [#4] activated when the additional connector (DCK) is plugged to a power supply.

5.3. Other Features and Advantages

The interconnection device can be implemented in a simple and inexpensive manner, as described in the embodiments and variants previously presented. Of course, this is not the only way to make this type of device and mechanisms other than those described could be substituted.

In the general case of use of the interconnection device, several scenarios of successive connections and disconnections of terminals may occur. An important point is that according to the invention, using the interconnection device, the communication terminal (TC) alternately plays the role of charger (in "master" mode) and of current receiver (charged, in "slave" mode). This role alternation is obtained by the detection or not of a power supply and/or a payment terminal connected to the interconnection device. To allow this alternation under favourable conditions to maintain the communication terminal in operational conditions, it may be desirable for the alternation of roles not to take place too abruptly. Some communication terminals may have more fragile electronic components than others and the interconnection device may take this situation into account in order to make these transitions acceptable. For this purpose, the inventors had the idea of integrating a timer within the interconnection device. This takes in all or part of the data transmission circuitry and all or part of the power supply management circuitry, as explained above. When a change of state is detected by the timer (that is to say connection disconnection of the device), the timer initiates a time counter (for example comprised between 1 and 3 seconds) which allows a transition which is more in line with the expectations of the communication terminal. The time counter (timer) is activated between the disconnection of a first device and the connection of a second device. Thus, the communication terminal has the time necessary to absorb the disconnection (both software and hardware absorption, allowing a "specific" disconnection to be made) before the connection of the second device is instantiated (allowing an equally "specific" connection to be made with sufficient time).

The invention claimed is:

1. A device for interconnecting a first terminal with a second terminal, device comprising:
   a transfer circuit;
   an interconnection circuit;
   a first male connector adapted to be inserted into a corresponding female connector of the first terminal, wherein the first male connector is a reversible connector comprising at least a first set and a second set of functionally identical pins;
   a second male connector adapted to be inserted into a corresponding female connector of the second terminal;
   a female connector, at least partially connected to the first set of pins of the first male connector by the transfer circuit and the second male connector is at least partially connected to the second set of pins of the first male connector by the interconnection circuit; and
   an electronic interconnection subsystem which comprises a data transfer switch and a power supply diverter, the transfer circuit and the interconnection circuit are at least partially under control of the electronic interconnection subsystem.

2. The interconnection device according to claim 1, wherein the female connector is a reversible connector.

3. The interconnection device according to claim 1, which further comprises an additional power supply connector.

4. The interconnection device according to claim 1, comprising the electronic interconnection subsystem and wherein the supply diverter comprises a pull-up resistor connected to a specific pin of the first male connector.

5. The interconnection device according to claim 4, wherein the electronic interconnection subsystem further comprises a timer.

6. A payment system comprising:
   a communication terminal having a reversible female port;
   a payment terminal having a female USB type port; and
   an interconnection device for interconnecting the communication terminal with the payment terminal, the interconnection device comprising:
   a transfer circuit;
   an interconnection circuit;
   a first male connector adapted to be inserted into the reversible female port of the communication terminal, wherein the first male connector is a reversible connector comprising at least a first set and a second set of functionally identical pins;

a second male connector adapted to be inserted into the female USB type port of the payment terminal;

a female connector, at least partially connected to the first set of pins of the first male connector by the transfer circuit and the second male connector is at least partially connected to the second set of pins of the first male connector by the interconnection circuit; and an electronic interconnection subsystem which comprises a data transfer switch and a power supply diverter, wherein the transfer circuit and the interconnection circuit are at least partially under control of the electronic interconnection subsystem.

* * * * *